INVENTOR
W. C. G. ORTEL
BY G. E. Kersey
ATTORNEY

Jan. 7, 1969 W. C. G. ORTEL 3,421,029

BISTABLE CIRCUIT EMPLOYING NEGATIVE RESISTANCE SEMICONDUCTOR DIODES

Filed Dec. 17, 1965

United States Patent Office 3,421,029

Patented Jan. 7, 1969

3,421,029
BISTABLE CIRCUIT EMPLOYING NEGATIVE RESISTANCE SEMICONDUCTOR DIODES

William C. G. Ortel, New York, N.Y., assignor to Bell Telephone Laboratories, Incorporated, New York, N.Y., a corporation of New York Filed Dec. 17, 1965, Ser. No. 514,507
U.S. Cl. 307—322 6 Claims
Int. Cl. H03k 3/26; 19/10; 23/14; 23/36

ABSTRACT OF THE DISCLOSURE

A bistable circuit suitable for use as a counter is constructed with two negative resistance diodes connected in a common cathode configuration. The diodes are preferably fabricated on a single semiconductive wafer. The characteristic curve of one of the diodes is adjusted by a padding resistor, and the diodes are biased to the same state by individual current sources.

This invention relates to circuitry for digital signals and, more particularly, to multistate circuitry for such signals.

Multistate circuits are indispensable to the processing of digital signals. Such circuits are capable of producing a change in state for each occurrence of a digital signal and are thus used, for example, as registers and as counters.

Since digital signals are double-valued, they are ordinarily employed with bistate circuits. For compactness bistate circuits often employ semiconductive active elements such as negative resistance diodes. The diodes are typically disposed in a series-aiding configuration to permit changes in state in response to digital signals of the unipolar variety. With this arrangement the diodes, although physically small, cannot be reduced further in size but must be included as separate elements. As a result, a further degree of miniaturization is hindered.

Accordingly, it is an object of the invention to facilitate the processing of digital signals. A related object is to do so through the use of compact multistate circuits.

A further object is to achieve the integration of multistate circuits employing semiconductive active elements. A still further object is to miniaturize bistate circuits which respond to unipolar digital signals.

In accomplishing the foregoing and related objects, the invention provides for the disposition of two voltage-controlled negative resistance devices in series-opposition, desirably fabricated on a common semiconductive wafer. The diodes are contained within distinctive loops which share a common leg that includes an inductive energy storage element. They are individually biased to the same signal state.

When a pulse signal is applied to the devices jointly, one of them changes state bringing about a change in the energy condition of the energy storage element. This causes the second device to follow the change of state of the first.

In accordance with one aspect of the invention, the biasing is arranged to restrict changes of state in response to input digital signals of incorrect polarity. According to another aspect of the invention, one of the diodes is accompanied by a series padding resistor which is proportioned to provide a relatively constant differential voltage at the input to the two diodes. This reduces any interaction between the input and the remainder of the circuit.

Other aspects of the invention will become apparent after considering an illustrative embodiment, taken in conjunction with the drawings, in which.

Figure 1:
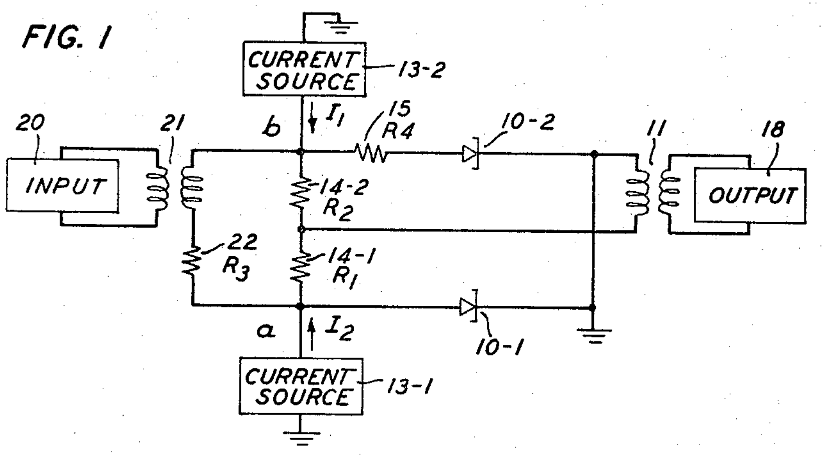
FIG. 1 is a schematic diagram of a bistate circuit in accordance with the invention.

Turning to FIG. 1, a bistate circuit in accordance with the invention includes two negative resistance diodes 10–1 and 10–2 sharing an inductive energy storage element 11 in common. The diode are biased from separate current sources 13–1 and 13–2 at respective terminals *a* and *b* to operating points determined by associated biasing resistors 14–1 and 14–2. One of the diodes 10–1 includes an auxiliary resistor 15 by which the composite characteristic of the two diodes at the biasing terminals *a* and *b* is controlled to facilitate switching action.

A unipolar digital signal input is applied from a source 20 by way of a transformer 21 across the biasing terminals *a* and *b*. The transformer is accompanied by a loading resistor 22 which assures proper bistable operation. Output from the circuit is obtained at a utilization circuit 23 by coupling to the magnetic field of the inductor 11.

The diodes 10–1 and 10–2 are disposed in series opposition with respect to ground. As a result, they are conveniently formed on a single semiconductive wafer and do not have to appear in the circuit as distinctive physical entities.

The diodes are biased by the action of the current sources 13–1 and 13–2, in conjunction with corresponding biasing resistors 14–1 and 14–2 so that an applied input will cause a change of state in one of the diodes which, in turn, will modify the stored energy of the common inductive element 11 to bring about a corresponding change of state in the other diode.

Figure 2A:
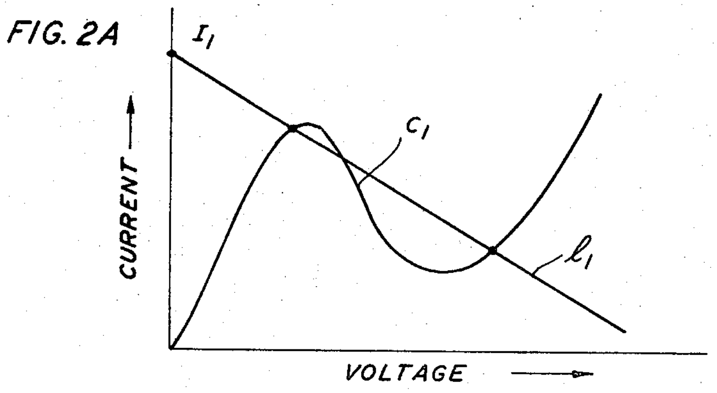
FIGS. 2A and 2B are graphical diagrams illustrating biasing arrangements for the circuit of FIG. 1.

Considering first the direct-current loop constituted of the first biasing resistor 14–1 and the first diode 10–1, the resistive magnitude $R_1$ of the first biasing resistor 14–1 is approximated in accordance with the graphical construct of FIG. 2A. The first diode 10–1 has a typical current-voltage characteristic $c_1$ of the kind associated with voltage-controlled negative resistance devices. The characteristic $c_1$ has first and second regions of positive resistance separated by an intervening region of negative resistance. To permit a change of state in response to a small amplitude input, the characteristic $c_1$ of the first diode 10–1 is intersected in its first region of positive resistance in the vicinity of a peak point by a load line $l_1$ associated with the first biasing resistor 14–1. The load line $l_1$, whose slope gives the reciprocal resistive magnitude of the first biasing resistor 14–1, intersects the characteristic $c_1$ in its second positive resistance region near a valley point.

Figure 2B:
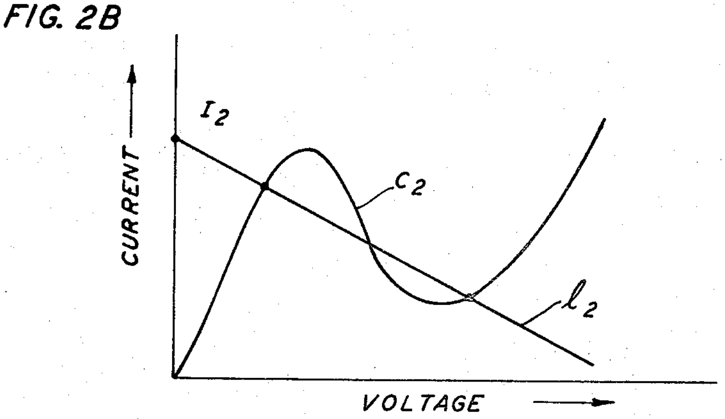

For the direct-current loop constituted of the second biasing resistor 14–2 and the second diode 10–2, the resistive magnitude $R_2$ of the second biasing resistor 14–2 is approximated in accordance with the graphical construct of FIG. 2B. The current-voltage characteristic $c_2$ of the second diode 10–2 is intersected by a load line $l_2$ associated with the second biasing resistor 14–2 in a fashion that is converse to the construct of FIG. 2A—the intersections being near a peak point and in the vicinity of a valley point.

Superficially, it would appear desirable for the operating points of both diodes 10–1 and 10–2 to be somewhat similar. However, the circuit of FIG. 1 is typically operated with unipolar pulse signals, and it is desirable for the circuit to be responsive to small amplitude pulses of that polarity, and unresponsive to small amplitude pulses of the opposite polarity. This kind of response is achieved by displacing the load line associated with the one of the diodes away from the peak point and displacing the load line associated with the other diode away from the valley point. Consequently, a small amplitude pulse signal of proper polarity produces a triggering effect upon the diode whose initial operating point is either close to a peak point or a valley point but a small amplitude signal of improper polarity brings the locus of operation for the other diode to the vicinity of either a peak or valley point without exceeding it.

As a consequence of the way in which the two load lines are displaced relative to each other, it is desirable to compensate for the fact that the curvature of a voltage-controlled characteristic is greater in the vicinity of a peak point than in the vicinity of a valley point. This is done by the inclusion of a padding resistor 15 in series with the second diode 10–2.

Figure 3:
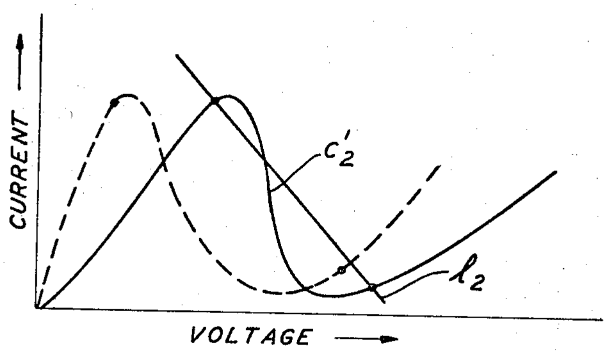
FIG. 3 is a graphical diagram illustrating a modification in the biasing of one of the active elements in the circuit of FIG. 1.

The effect of the resistance $R_4$ of the padding resistor 15 is to create a composite characteristic $C'_2$ shown in FIG. 3 which is intersected by the load line $l_2$ in such a fashion that the voltage change for the second diode 10–2 is identical with that of the first diode 10–1. As a result, the portion of circuit beyond the biasing terminals *a* and *b* is electrically isolated from the input.

Figure 4:
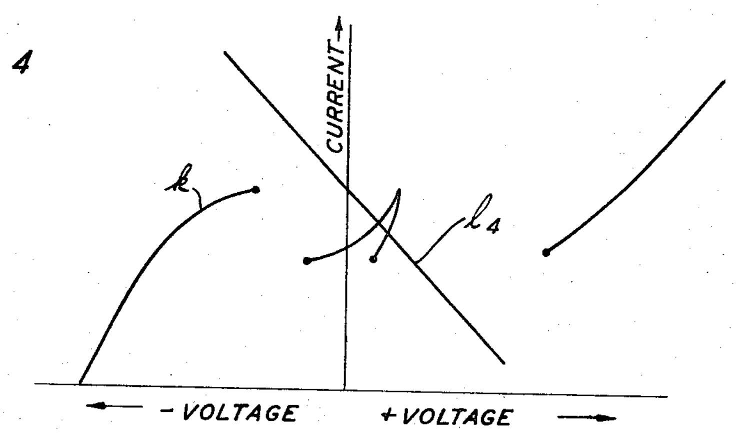
FIG. 4 is a composite current-voltage characteristic at the input of the circuit of FIG. 1.

When an input pulse signal is applied at the biasing terminals *a* and *b* one of the diodes is caused to change state and subsequently, because of the change in energy storage of the inductor 11, will bring about a corresponding change of state in the second diode. Although the input is electrically isolated from the two diodes, it should, nevertheless, have a sufficiently low impedance that both diodes will be in the same state regardless of the switching condition that obtains at a particular time. As shown in FIG. 4, this situation is satisfied when the load line $l_3$ associated with auxiliary loading resistor 22 of resistance $R_3$ is so proportioned that it intersects the mid portion of the composite characteristic *k* of the two diodes. Such a composite characteristic is well known for series-connected negative resistance diodes. The double-lined mid portion of the characteristic represents the condition for which both diodes are in the same low voltage state or in the same high voltage state. As long as the loading resistor 22 produces an intersection in the mid region of the composite characteristic *k*, both diodes 10–1 and 10–2 are constrained to be in the same state regardless of the applied input.

Figure 5:
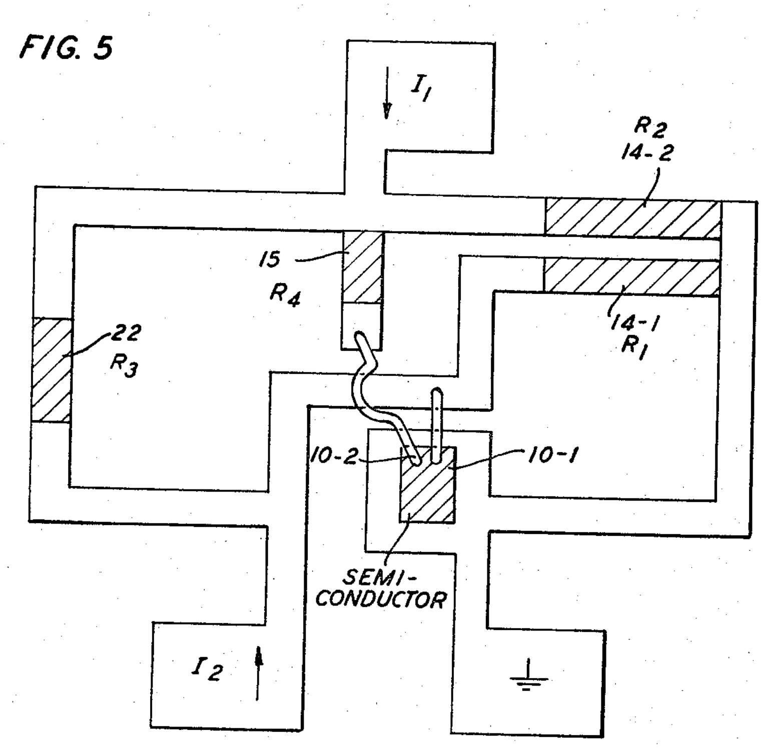
FIG. 5 is a schematic diagram of a hybrid, integrated version of the circuit of FIG. 1.

The bistate circuit of FIG. 1 may be constructed on a planar base as a hybrid integrated circuit, as shown in FIG. 5. The passive components 14–1, 14–2, 15 and 12 of the circuit are formed by selective photoetching of thin films of tantalum nitride which have been previously disposed on a plane substrate. The passive components are linked by a narrow line deposit of gold film which forms inductive loops corresponding to the inductor 11 of FIG. 1 and one-half of the transformer 21. The negative resistance diodes 10–1 and 10–2 are formed on an n-type germanium semiconductor wafer which has been bonded to a gold area of the circuit and consist of junctions between the semiconductor and aluminum wires. A significant feature of the single wafer construction of FIG. 5 is the formation of two series-opposed tunnel diodes on a single germanium wafer embedded in a gold contact area which extends to a larger contact area which serves as the point of ground connection. The connection between the semiconductive wafer and the gold contact area is, for example, by the process of eutectic bonding. Aluminum wires are bonded by thermocompression to adjacent gold contact points of the circuit and extend to the surface of the germanium wafer to which they are bonded by passing a momentary pulse of current, forming small p-type regions and hence tunnel junctions at the points of contact with the semiconductor.

Coupling in and out of the circuit can be obtained magnetically if inductive loops are placed adjacent to the circuit loops to form transformers 11 and 12. Such loops can be formed on the same substrate as the circuit of FIG. 5 or on similar substrates, stacked adjacent to it. Furthermore, stages of the kind shown in FIG. 5 can be readily coupled together to form a chain in which all diodes have one terminal at ground potential and can therefore share the same semiconductor wafer.

Desirably, in such a chain, the same inductive loop that forms the secondary of transformer 11 in any one stage also serves as the primary of transformer 21 of the succeeding (driven) stage. In this arrangement, because of the well-known differentiating action of the inductive coupling, the series of pulses at the input to a stage are alternately of opposite polarities, for one of which a triggered response is desired from the succeeding stage, and for the other, no response. The displaced load lines heretofore described provide such discriminate triggering.

It is to be noted that it is the series-opposed arrangement of the negative resistance diodes that permits fabrication of the single wafer counter-circuits shown in FIG. 5.

Other adaptations and employments of the invention will occur to those skilled in the art.

What is claimed is:

1. A bistable counter circuit comprising, first and second negative resistance diodes connected together in a common cathode configuration, an inductive element directly connected to the common cathode terminals of said diodes, and means for biasing said diodes to the same state.

2. A bistable circuit comprising first and second negative resistance diodes, said diodes having their cathodes connected to a common point, an inductive element connected to said common point, means for selectively adjusting the voltage-current characteristic of said first diode to match the voltage-current characteristic of said second diode, and first and second biasing means for biasing said first and second diodes to be in the same state.

3. A bistable circuit as defined in claim 2 wherein said means for adjusting said characteristic comprises a selected padding resistor interconnecting said first biasing means with said first diode.

4. A bistable circuit as defined in claim 3 further including a first biasing resistor for establishing a load line which intersects the current-voltage characteristic of one of said diodes in the vicinity of a peak point and near a valley point, and a second biasing resistor for establishing a load line which intersects the current voltage characteristic of the other of said diodes in the vicinity of a valley point and near a peak point.

5. A bistable circuit as defined in claim 4 wherein said diodes present to the applying means a composite current voltage characteristic including an intermediate region of positive resistance and said applying means includes means for confining the operation of said circuit to said intermediate region of positive resistance.

6. A bistable circuit as defined in claim 5 wherein (1) passive components of said circuit are formed by selective photoetching of thin films of tantalum nitride deposited on a plane substrate; (2) the passive components are linked by a narrow line deposit of conductive gold film; (3) the negative resistance diodes are formed on an n-type germanium semiconductive wafer which has been bonded to a gold area of the circuit and consists of junctions between said semiconductor wafer and aluminum wires extending to and making contact with said gold film.

(References on following page)

References Cited

UNITED STATES PATENTS

| | | | |
|---|---|---|---|
| 2,983,854 | 5/1961 | Pearson | 317—235 |
| 3,124,704 | 3/1964 | Bigo et al. | 307—88.5 |
| 3,151,253 | 9/1964 | Habayeb | 307—88.5 |
| 3,187,266 | 6/1965 | Marshall | 330—34 |
| 3,201,614 | 8/1965 | Cubert et al. | 307—88.5 |
| 3,217,180 | 11/1965 | Berman | 307—88.5 |
| 3,217,268 | 11/1965 | Kuo Chen Hu | 331—107 |
| 3,227,955 | 1/1966 | Yasuda et al. | 325—449 |
| 3,248,614 | 4/1966 | Rutz | 317—234 |
| 3,278,762 | 10/1966 | Cooperman | 307—88.5 |

JOHN W. HUCKERT, *Primary Examiner.*

R. SANDLER, *Assistant Examiner.*

U.S. Cl. X.R.

307—289, 220, 221, 298; 317—234, 235